(12) United States Patent
Luebke et al.

(10) Patent No.: US 10,008,043 B2
(45) Date of Patent: Jun. 26, 2018

(54) NEAR-EYE PARALLAX BARRIER DISPLAYS

(71) Applicant: NVIDIA Corporation, Santa Clara, CA (US)

(72) Inventors: David Luebke, Charlottesville, VA (US); Douglas Patrick Lanman, Sunnyvale, CA (US); Thomas Francis Fox, Palo Alto, CA (US); Gerrit Slavenburg, Fremont, CA (US)

(73) Assignee: NVIDIA CORPORATION, Santa Clara, CA (US)

( * ) Notice: Subject to any disclaimer, the term of this patent is extended or adjusted under 35 U.S.C. 154(b) by 0 days. days.

(21) Appl. No.: 15/351,297

(22) Filed: Nov. 14, 2016

(65) Prior Publication Data

US 2017/0061698 A1    Mar. 2, 2017

Related U.S. Application Data

(63) Continuation of application No. 13/720,831, filed on Dec. 19, 2012, now Pat. No. 9,494,797.
(Continued)

(51) Int. Cl.
    *G09G 5/00*    (2006.01)
    *G06T 19/00*    (2011.01)
    (Continued)

(52) U.S. Cl.
    CPC .......... *G06T 19/006* (2013.01); *G02B 27/017* (2013.01); *G02B 27/0172* (2013.01);
    (Continued)

(58) Field of Classification Search
    CPC ............ G02B 27/017; G02B 2027/014; G02B 2027/011
    (Continued)

(56) References Cited

U.S. PATENT DOCUMENTS 6,061,179 A    5/2000    Inoguchi et al.
6,215,593 B1    4/2001    Bruce
(Continued)

FOREIGN PATENT DOCUMENTS

CN    1653374    8/2005
CN    101184166    5/2008
(Continued)

OTHER PUBLICATIONS

Pamplona et al., "Tailored Displays to Compensate for Visual Aberrations," ACM Transactions on Graphics, vol. 31, No. 4, Jul. 2012, publication date Aug. 5, 2012.
(Continued)

*Primary Examiner* — Michael Pervan
*Assistant Examiner* — Andrew Lee

(57) ABSTRACT

In embodiments of the invention, an apparatus may include a display comprising a plurality of pixels and a computer system coupled with the display and operable to instruct the display to display images. The apparatus may further include an SLM array located adjacent to the display and comprising a plurality of SLMs, wherein the SLM array is operable to produce a light field by altering light emitted by the display to simulate an object that is in focus to an observer while the display and the SLM array are located within a near-eye range of the observer.

26 Claims, 14 Drawing Sheets

Related U.S. Application Data

(60) Provisional application No. 61/667,362, filed on Jul. 2, 2012, provisional application No. 61/668,953, filed on Jul. 6, 2012.

(51) Int. Cl.
*G02B 27/01* (2006.01)
*G06F 3/01* (2006.01)
*H04N 13/04* (2006.01)

(52) U.S. Cl.
CPC ......... *G06F 3/013* (2013.01); *H04N 13/0436* (2013.01); *G02B 2027/011* (2013.01); *G02B 2027/014* (2013.01); *G02B 2027/0138* (2013.01)

(58) Field of Classification Search
USPC ....................................................... 345/6–8
See application file for complete search history.

(56) References Cited

U.S. PATENT DOCUMENTS

| | | | |
|---|---|---|---|
| 8,259,165 B2 | 9/2012 | Schwerdtner | |
| 9,557,565 B2 | 1/2017 | Luebke | |
| 2001/0010508 A1 | 8/2001 | Kakeya | |
| 2002/0114078 A1 | 2/2002 | Halle et al. | |
| 2002/0089467 A1 | 7/2002 | Hara | |
| 2003/0025849 A1 | 2/2003 | Hara | |
| 2004/0208394 A1 | 10/2004 | Kurata | |
| 2006/0170616 A1 | 8/2006 | Hirayama et al. | |
| 2007/0002274 A1 | 1/2007 | Somani et al. | |
| 2008/0211995 A1 | 9/2008 | Jeon et al. | |
| 2008/0239499 A1 | 10/2008 | Fukuda | |
| 2009/0244682 A1 | 10/2009 | Saishu et al. | |
| 2011/0157667 A1 | 6/2011 | Lacoste et al. | |
| 2011/0164047 A1 | 7/2011 | Pance | |
| 2012/0086624 A1* | 4/2012 | Thompson | G02B 27/017 345/8 |
| 2012/0092514 A1 | 4/2012 | Vandame | |
| 2012/0206323 A1* | 8/2012 | Osterhout | G02B 27/0093 345/8 |
| 2013/0021226 A1* | 1/2013 | Bell | G02B 3/0006 345/8 |
| 2013/0106674 A1* | 5/2013 | Wheeler | G02B 27/017 345/8 |
| 2013/0176386 A1 | 7/2013 | Midavaine | |
| 2013/0242402 A1 | 9/2013 | Konig | |
| 2013/0285885 A1 | 10/2013 | Nowatzyk et al. | |
| 2014/0118829 A1 | 5/2014 | Ma et al. | |

FOREIGN PATENT DOCUMENTS

| | | |
|---|---|---|
| CN | 102445755 | 5/2012 |
| DE | 69216391 | 4/1997 |
| DE | 102006049404 | 4/2008 |
| DE | 102008020858 | 11/2009 |
| DE | 102008039987 | 3/2010 |
| DE | 102008042397 | 4/2010 |
| TW | 201219829 | 5/2012 |
| TW | 201228380 | 7/2012 |
| WO | 2011156721 | 12/2011 |
| WO | 2012034963 | 3/2012 |
| WO | 2012062681 | 5/2012 |

OTHER PUBLICATIONS

Alonso Jr. et al., "Pre-Compensation for High-Order Aberrations of the Human Eye Using On-Screen Image Deconvolution", IEEE, Sep. 2003, pp. 556-559.

* cited by examiner

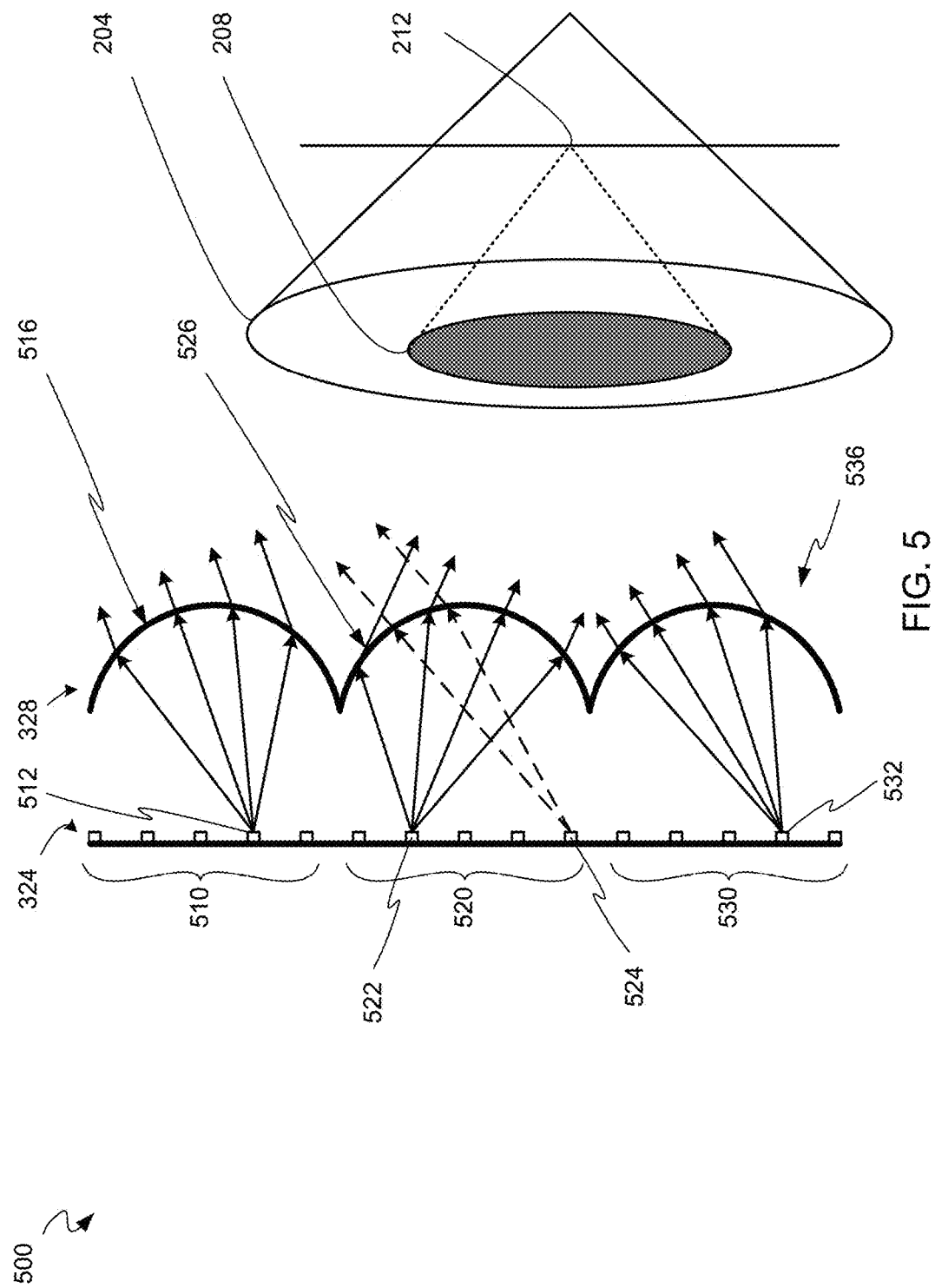

NEAR-EYE PARALLAX BARRIER DISPLAYS

CROSS-REFERENCE TO RELATED APPLICATIONS

This application is a continuation of U.S. patent application Ser. No. 13/720,831, filed Dec. 19, 2012, and claims priority to U.S. Provisional Application No. 61/667,362, filed Jul. 2, 2012, the entire disclosure of which is incorporated herein by reference. This application also claims priority to U.S. Provisional Application No. 61/668,953, filed Jul. 6, 2012, the entire disclosure of which is incorporated herein by reference. The following U.S. Patent Applications are also incorporated herein by reference for all purposes: U.S. patent application Ser. No. 13/720,809 "NEAR-EYE MICROLENS ARRAY DISPLAYS," David Luebke, filed Dec. 20, 2012; and U.S. patent application Ser. No. 13/720,842, "NEAR-EYE OPTICAL DECONVOLUTION DISPLAYS," David Luebke, filed Dec. 20, 2012.

BACKGROUND OF THE INVENTION

Near-eye displays (NEDs) include head-mounted displays (HMDs) that may project images directly into a viewer's eyes. Such displays may overcome the limited screen size afforded by other mobile display form factors by synthesizing virtual large-format display surfaces, or may be used for virtual or augmented reality applications.

Near-eye displays can be divided into two broad categories: immersive displays and see-through displays. The former may be employed in virtual reality (VR) environments to completely encompass a user's field of view with synthetically-rendered imagery. The latter may be employed in augmented reality (AR) applications, where text, other synthetic annotations, or images may be overlaid in a user's view of the physical environment. In terms of display technology, AR applications require semi-transparent displays (e.g., achieved by optical or electro-optical approaches), such that the physical world may be viewed simultaneously with the near-eye display.

Near-eye displays have proven difficult to construct due to the fact that the unaided human eye cannot accommodate (focus) on objects placed within close distances, for example, the distance between the lenses of reading glasses to a user's eye when the user is wearing the glasses. As a result, NED systems have conventionally required complex and bulky optical elements to allow the viewer to comfortably accommodate on the near-eye display, which would otherwise be out of focus, and the physical environment.

A conventional solution is to place a beam-splitter (e.g., a partially-silvered mirror) directly in front of the viewer's eye. This allows a direct view of the physical scene, albeit with reduced brightness. In addition, a display (e.g., an LCD panel) is placed on the secondary optical path. Introducing a lens between the beam-splitter and the display has the effect of synthesizing a semi-transparent display located within the physical environment. In practice, multiple optical elements are required to minimize aberrations and achieve a wide field of view for such a solution, leading to bulky and expensive eyewear that has prohibited widespread consumer adoption.

A conventional solution for VR applications is to place a magnifier in front of a microdisplay. For example, a single lens placed over a small LCD panel so that the viewer can both accommodate or focus on the display, despite the close distance, as well as magnify the display, so that it appears to be much larger and at a greater distance.

BRIEF SUMMARY OF THE INVENTION

In embodiments of the invention, an apparatus may include a display comprising a plurality of pixels and a computer system coupled with the display and operable to instruct the display to display images. The apparatus may further include an SLM array located adjacent to the display and comprising a plurality of SLMs, wherein the SLM array is operable to produce a light field by altering light emitted by the display to simulate an object that is in focus to an observer while the display and the SLM array are located within a near-eye range of the observer.

Various embodiments of the invention may include an apparatus comprising a display operable to produce an image. The apparatus may further include a first SLM array located adjacent to the display, wherein the first SLM array together with the display is operable to produce a light field simulating a 3D object that is recognizable to an observer while the display and the first SLM array are located within a near-eye range of the observer.

Some embodiments of the invention may include a method comprising determining a pre-filtered image to be displayed, wherein the pre-filtered image corresponds to a target image. The method may further include displaying the pre-filtered image on a display and producing a near-eye light field after the pre-filtered image travels through an SLM array adjacent to the display, wherein the near-eye light field is operable to simulate a light field corresponding to the target image.

The following detailed description together with the accompanying drawings will provide a better understanding of the nature and advantages of the present invention.

BRIEF DESCRIPTION OF THE DRAWINGS

Embodiments of the present invention are illustrated by way of example, and not by way of limitation, in the figures of the accompanying drawings and in which like reference numerals refer to similar elements.

FIG. 5 illustrates a side view of the magnified view of the near-eye microlens array display, according to embodiments of the present invention.

DETAILED DESCRIPTION OF THE INVENTION

Figure 1:
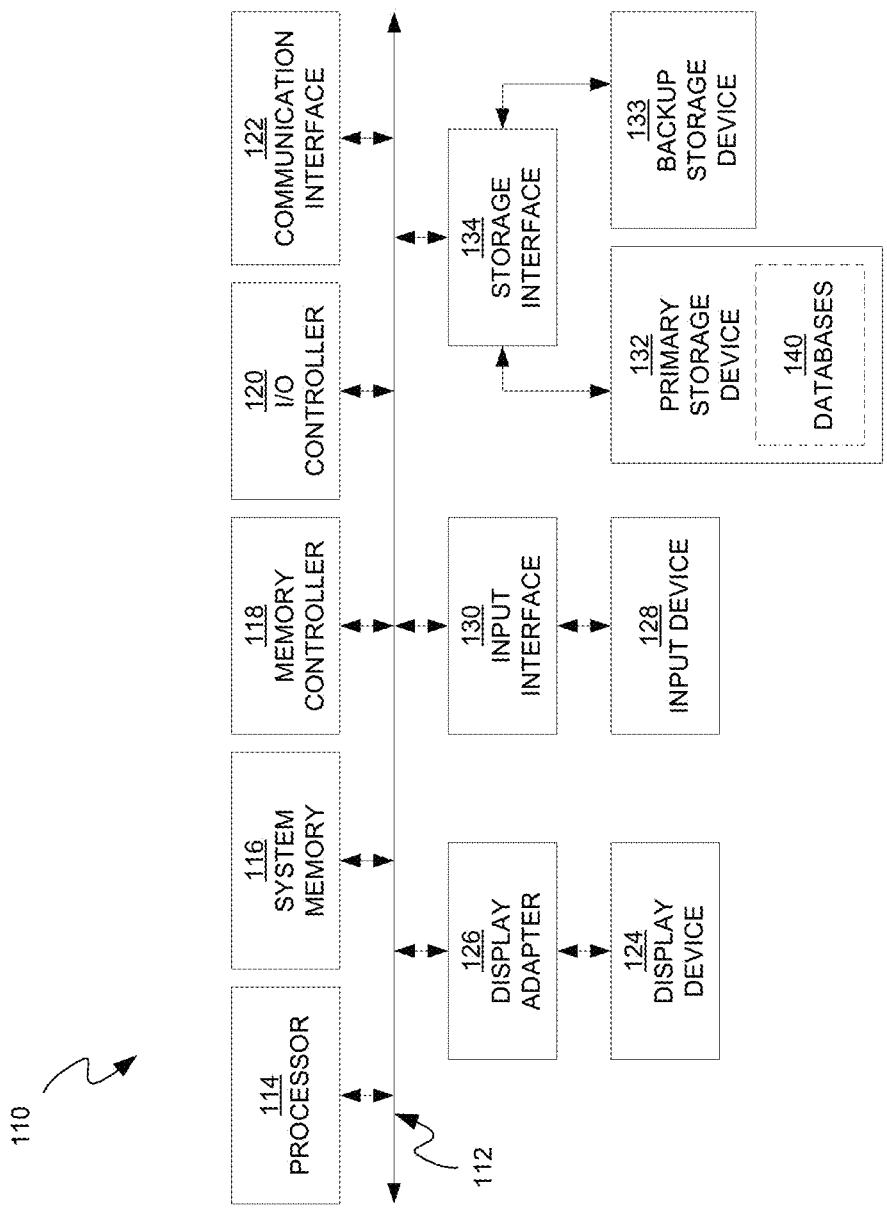
FIG. 1 is an exemplary computer system, in accordance with embodiments of the present invention.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "displaying," "generating," "producing," "calculating," "determining," "radiating," "emitting," "attenuating," "modulating," "convoluting," "deconvoluting," "performing," or the like, refer to actions and processes (e.g., flowcharts 1300 and 1400 of FIGS. 13 and 14) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer-readable storage media and communication media; non-transitory computer-readable media include all computer-readable media except for a transitory, propagating signal. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared, and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, worn devices (e.g., head-mounted or waist-worn devices), or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, an eye-track adjustment system, environmental motion-tracking sensor, an internal motion-tracking sensor, a gyroscopic sensor, accelerometer sensor, an electronic compass sensor, or any other input device.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or it may represent multiple databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware.

For example, a computer program for determining a pre-filtered image based on a target image may be stored on the computer-readable medium and then stored in system memory 116 and/or various portions of storage devices 132 and 133. When executed by the processor 114, the computer program may cause the processor 114 to perform and/or be a means for performing the functions required for carrying out the determination of a pre-filtered image discussed above.

Near-Eye Displays

Embodiments of the present invention provide near-eye displays including thin stacks of semi-transparent displays operable to be placed directly in front of a viewer's eye together with pre-processing algorithms for evaluating the depicted multilayer imagery, without the need for additional costly or bulky optical elements to support comfortable accommodation.

Embodiments of the present invention allow for attenuation-based light field displays that may allow lightweight near-eye displays. It should be appreciated that other embodiments are not limited to only attenuation-based light field displays, but also light-emitting-based light field displays. Using near-eye light field displays, comfortable viewing may be achieved by synthesizing a light field corresponding to a virtual display located within the accommodation range of an observer.

Embodiments of the present invention provide near-eye displays including one or more displays placed proximate to a viewer's eye where the target imagery is deconvolved by the estimated point spread function for the eye, rather than synthesizing a light field supporting comfortable accommodation. Further, embodiments of the present invention provide additional methods for near-eye displays, including methods combining light field display and optical deconvolution, as well as extensions to holographic displays.

Figure 2A:
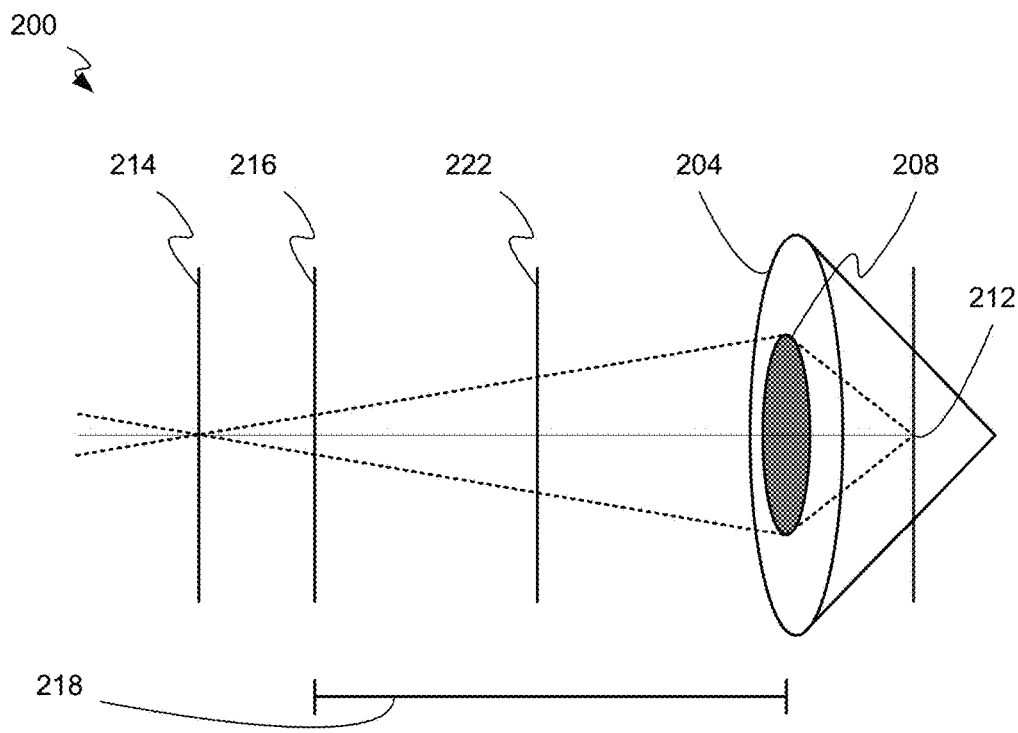
FIG. 2A illustrates an eye of an observer and a corresponding minimum accommodation distance.

FIG. 2A illustrates an eye 204 of an observer and a corresponding minimum accommodation distance 218. The eye 204 includes a lens 208 that focuses viewed objects onto a retina plane 212 of the eye 204. The eye 204 may be capable of focusing on objects at various distances from the eye 204 and lens 208. For example, the eye 204 may be able to focus on an object that is located farther from the eye 204 than a near plane 216, e.g., at a plane of focus 214 beyond the near plane 216.

Accordingly, the eye 204 may have a minimum accommodation distance 218 that defines the minimum distance of an object at which the eye 204 is capable of focusing on. In other words, the eye 204 may be incapable of focusing on an object that is located at a distance from the eye 204 that is less than the minimum accommodation distance 218 or closer to the eye 204 than the near plane 216. For example, if the surface of an object is located at a near-eye plane 222 that is located a distance from the eye 204 less than the minimum accommodation distance 218, the surface of the object will be out of focus to the observer. Objects that are farther from the eye 204 than the near plane 216 are inside an accommodation range and objects that are nearer to the eye 204 than the near plane 216 are outside the accommodation range. Objects that are nearer to the eye 204 than the near plane 216 are in a near-eye range.

Figures 2B, 2C:
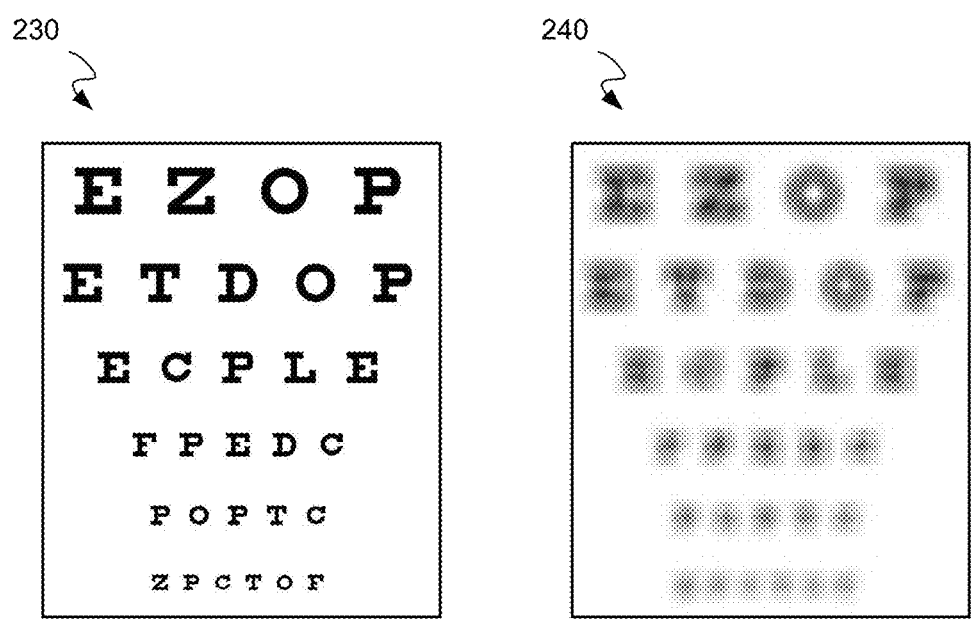
FIGS. 2B and 2C depict perceived images at different viewing distances of an observer.

FIGS. 2B and 2C depict perceived images 230 and 240 at different viewing distances of an observer. For example, FIG. 2B shows an eye exam chart 230 as it would be perceived by an observer if it were located at the plane of focus 214 of the eye 204 in FIG. 2A. Or, the eye exam chart 230 may be located at a different plane of focus, as long as the eye exam chart 230 is within the accommodation range. As can be appreciated, the eye exam chart 230 is in focus, sharp, and/or recognizable.

Alternatively, FIG. 2C shows an eye exam chart 240 as it would be perceived by an observer if it were located nearer to the eye 204 than the plane of focus 214 in FIG. 2A. In other words, the eye exam chart 230 may be located outside the accommodation range at, for example, the near-eye plane 222. As can be appreciated, the eye exam chart 240 is out of focus, blurry, and/or unrecognizable.

Near-Eye Microlens Array Displays

Conventional displays, such as liquid crystal displays (LCDs) and organic light-emitting diodes (OLEDs), may be designed to emit light isotropically (uniformly) in all directions. In contrast, light field displays support the control of individual rays of light. For example, the radiance of a ray of light may be modulated as a function of position across the display, as well as the direction in which the ray of light leaves the display.

Figure 3A:
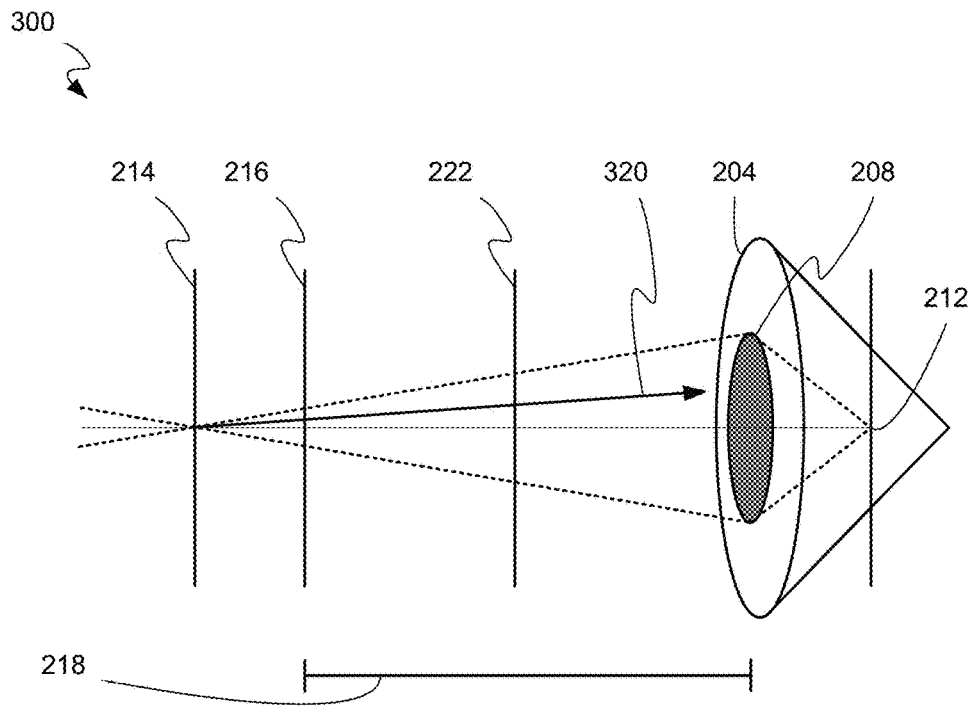
FIG. 3A illustrates a ray of light originating from a plane of focus, according to embodiments of the present invention.

FIG. 3A illustrates a ray of light 320 originating from a plane of focus 214, according to embodiments of the present invention. FIG. 3A includes the same eye 204, lens 208, retina plane 212, plane of focus 214, and accommodation distance 218 of FIG. 2A. FIG. 3A also includes a ray of light 320 that originates from the surface of an object that is located at the plane of focus 214. The origination point, angle, intensity, and color of the ray of light 320 and other rays of light viewable by the observer provide a view of an in-focus object to the observer.

Figure 3B:
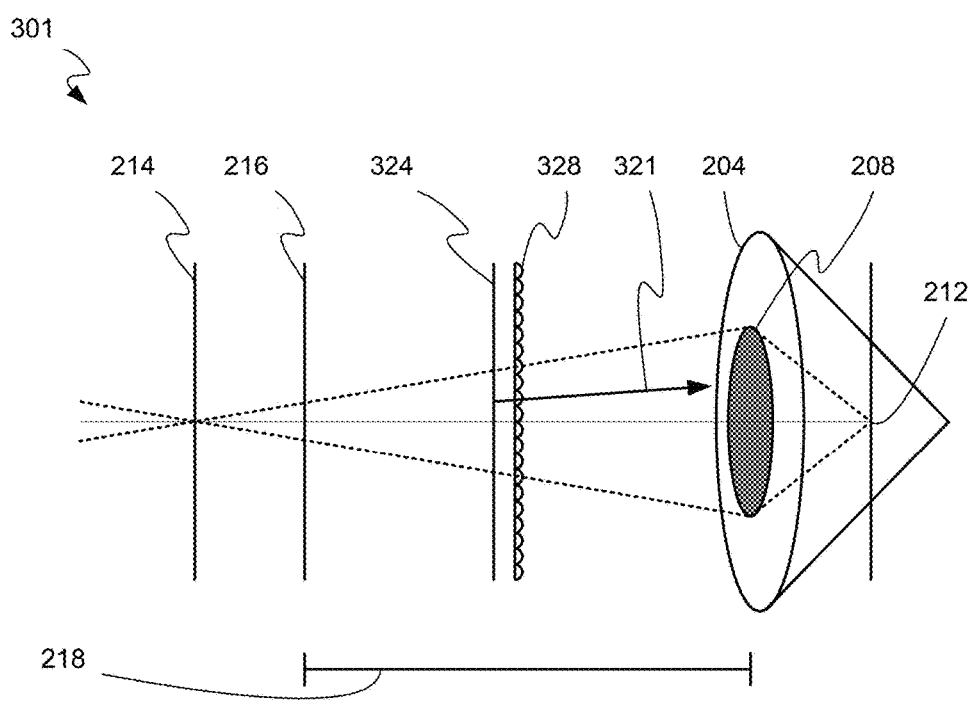
FIG. 3B illustrates a side view of a near-eye microlens array display, according to embodiments of the present invention.

FIG. 3B illustrates a side view of a near-eye microlens array display 301, according to embodiments of the present invention. FIG. 3B includes the same elements as FIG. 3A, with the addition of a display 324 and a microlens array 328. While FIG. 3A shows the microlens array 328 between the display 324 and the eye 204, embodiments allow for the display 324 to be positioned between the microlens array 328 and the eye 204.

The display 324 may be, but is not limited to being, an LCD or OLED. The microlens array 328 may be a collection of multiple microlenses. The microlens array 328 or each individual microlens may be formed by multiple surfaces to minimize optical aberrations. The display 324 may provide an image, where the image emits rays of light isotropically. However, when the rays of light reach the microlens array 328, the microlens array 328 may allow certain rays of light to refract toward or pass through toward the eye 204 while refracting other rays of light away from the eye 204.

Accordingly, the microlens array 328 may allow the light from select pixels of the display 324 to refract toward or pass through toward the eye 204, while other rays of light pass through but refract away from the eye 204. As a result, the microlens array 328 may allow a ray of light 321 to pass through, simulating the ray of light 320 of FIG. 3A. For example, the ray of light 321 may have the same angle, intensity, and color of the ray of light 320. Importantly, the ray of light 321 does not have the same origination point as the ray of light 320 since it originates from display 324 and not the plane of focus 214, but from the perspective of the eye 204, the ray of light 320 is equivalent to the ray of light 321. Therefore, regardless of the origination point of the ray of light 321, the object represented by the ray of light 321 appears to be located at the plane of focus 214, when no object in fact exists at the plane of focus 214.

It should be appreciated that the microlenses or the microlens array 328 entirely may be electro-optically switchable such that the microlens array 328 may be configured to be either transparent or opaque (e.g., appearing as a flat sheet of glass). For example, the microlens array 328 may be formed by liquid crystals or by birefringent optics, together with polarizers. As a result, such switchable microlenses may be electronically controlled, alternatingly from a microlens array operable to display a light field to an opaque element appearing similar to a flat sheet of glass, operable to allow the viewing of the surrounding environment. The transparent and opaque modes may be rapidly alternated between, spatially-multiplexed, or combined spatially and temporally modulated. Accordingly, augmented-reality applications may be provided, similar to those discussed with respect to FIGS. 6-10. Further, virtual-reality applications may be provided using a fixed microlens array.

Importantly, the display 324 is located outside the accommodation range of the eye 204. In other words, the display 324 is located at a distance less than the minimum accommodation distance 218. However, because the microlens array 328 creates a light field (as discussed below) that mimics or simulates the rays of light emitted by an object outside the minimum accommodation distance 218 that can be focused on, the image shown by display 324 may be in focus.

Figure 4:
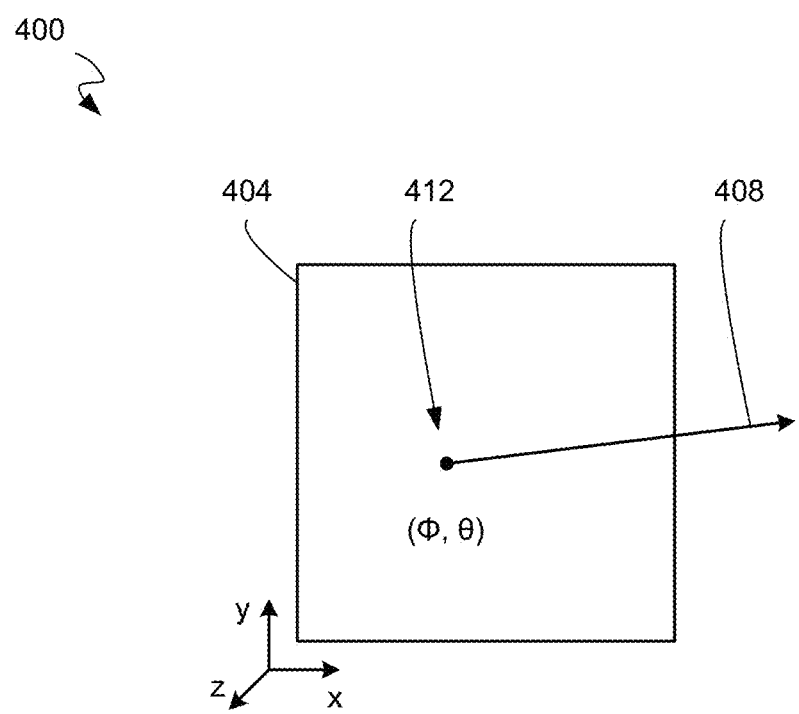
FIG. 4 illustrates a ray of light that is part of a light field, according to embodiments of the present invention.

FIG. 4 illustrates a ray of light 408 that is part of a light field, according to embodiments of the present invention. The light field may define or describe the appearance of a surface 404, multiple superimposed surfaces, or a general 3D scene. For a general virtual 3D scene, the set of (virtual) rays that may impinge on the microlens array 328 must be recreated by the near-eye display device. As a result, the surface 404 would correspond to the plane of the display 324 and each ray 408 would correspond to a ray 320 intersecting the plane of the display 324, resulting in the creation of an emitted ray 321 from the near-eye light field display.

More specifically, the light field may include information for rays of light for every point and light ray radiation angle on the surface 404, which may describe the appearance of the surface 404 from different distances and angles. For example, for every point on surface 404, and for every radiation angle of a ray of light, information such as intensity and color of the ray of light may define a light field that describes the appearance of the surface 404. Such information for each point and radiation angle constitute the light field.

In FIG. 4, the ray of light 408 my radiate from an origination point 412 of the surface 404, which may be described by an 'x' and 'y' coordinate. Further, the ray of light 408 may radiate into 3-dimensional space with an x (horizontal), y (vertical), and z (depth into and out of the page) component. Such an angle may be described by the angles $\Phi$ and $\theta$. Therefore, each $(x, y, \Phi, \theta)$ coordinate may describe a ray of light, e.g., the ray of light 408 shown. Each $(x, y, \Phi, \theta)$ coordinate may correspond to a ray of light intensity and color, which together form the light field. For video applications, the light field intensity and color may vary over time (t) as well.

Once the light field is known for the surface 404, the appearance of the surface 404, with the absence of the actual surface 404, may be created or simulated to an observer. The origination points of rays of light simulating the surface 404 may be different from the actual origination points of the actual rays of light from the surface 404, but from the perspective of an observer, the surface 404 may appear to exist as if the observer were actually viewing it.

Returning to FIG. 3B, the display 324 in conjunction with the microlens array 328 may produce a light field that may mimic or simulate an object at the plane of focus 214. As discussed above, from the perspective of the eye 204, the ray of light 321 may be equivalent to the ray of light 320 of FIG. 3A. Therefore, an object that is simulated to be located at the viewing plane 214 by the display 324 and the microlens array 328 may appear to be in focus to the eye 204 because the equivalent light field for a real object is simulated. Further, because the equivalent light field for a real object is simulated, the simulated object will appear to be 3-dimensional.

In some cases, limitations of a light field display's resolution may cause a produced ray of light to only approximately replicate ray. For example, with respect to FIGS. 3A and 3B, the ray of light 321 may have a slightly different color, intensity, position, or angle than the ray of light 320. Given the quality of the pre-filtering algorithm, the capabilities of the near-eye light field display, and the ability of the human visual system to perceive differences, the set of rays 321 emitted by the near-eye display may approximate or fully replicate the appearance of a virtual object, such as the place 404. In cases where the appearance is approximated, rays may not need to be exactly replicated for appropriate or satisfactory image recognition.

FIG. 5 illustrates a magnified side view of the display 324 and microlens array 328 of FIG. 3B, according to embodiments of the present invention. FIG. 5 also includes the eye 204 of an observer of FIG. 3B.

The display 324 may include multiple pixels, for example, pixels 512, 522, 524, and 532. There may be pixel groups, for example, the pixel group 510 including the pixel 512, the pixel group 520 including the pixels 522 and 524, and the pixel group 530 including the pixel 532. Each pixel group may correspond with a microlens of the microlens array 328. For example, the pixel groups 510, 520, and 530 may be located adjacent to microlenses 516, 526, and 536, respectively.

As discussed above, the pixels may emit light isotropically (uniformly) in all directions. However, the microlens array 328 may align the light emitted by each pixel to travel substantially anisotropically (non-uniformly) in one direction or in a narrow range of directions (e.g., an outgoing beam may spread or converge/focus by a small angle). In fact, it may be desirable in some cases. For example, the pixel 532 may emit rays of light in all directions, but after the rays of light reach the microlens 536, the rays of light may be all caused to travel in one direction. As shown, the rays of light emitted by pixel 532 may all travel in parallel toward the eye 204 after they have passed through the microlens 536. As a result, the display 324 and microlens array 328 are operable to create a light field using rays of light to simulate the appearance of an object.

The direction that the rays of light travel may depend on the location of the emitting pixel relative to a microlens. For example, while the rays emitted by the pixel 532 may travel toward the upper right direction, rays emitted by the pixel 522 may travel toward the lower right direction because pixel 522 is located higher than pixel 532 relative to their corresponding microlenses. Accordingly, the rays of light for each pixel in pixel group may not necessarily travel toward the eye. For example, the dotted rays of light emitted by pixel 524 may not travel toward the eye 204 when the eye 204 is positioned as shown.

It should be appreciated that the display 324 may include rows and columns of pixels such that a pixel that is located into or out of the page may generate rays of light that may travel into or out of the page. Accordingly, such light may be caused to travel in one direction into or out of the page after passing through a microlens.

It should also be appreciated that the display 324 may display an image that is recognizable or in focus only when viewed through the microlens array 328. For example, if the image produced by the display 324 is viewed without the microlens array 328, it may not be equivalent to the image perceived by the eye 204 with the aid of the microlens array 328 even if viewed at a distance farther than the near plane 216. The display 324 may display a pre-filtered image, corresponding to a target image to be ultimately projected, that is unrecognizable when viewed without the microlens array 328. When the pre-filtered image is viewed with the microlens array 328, the target image may be produced and recognizable. A computer system or graphics processing system may generate the pre-filtered image corresponding to the target image.

It should further be noted that separate microlens arrays and/or displays may be placed in front of each eye of a viewer. Accordingly, binocular viewing may be achieved. As a result, the depth perception cues of binocular disparity and convergence may be fully or approximately simulated. Each light field may also support the depth cue to accommodation (focusing) to be correctly simulated. Furthermore, by using a pair of near-eye light field displays, binocular disparity, convergence, and accommodation are simultaneously and fully or approximately simulated, producing a "comfortable" sensation of the 3D scene extending behind the display 324.

In addition, since the synthesized light field may extend beyond the lens/pupil 208, the viewer may move left/right/up/down, rotate their head, or change the distance between their eye 204 (e.g., due to different users), maintaining the illusion of the virtual 3D scene. Embodiments of the present invention also support a fourth depth cue called motion parallax.

Further, it should be appreciated that microlens arrays and/or displays may occupy only a portion of the view of an observer.

Near-Eye Parallax Barrier Displays

Figure 6A:
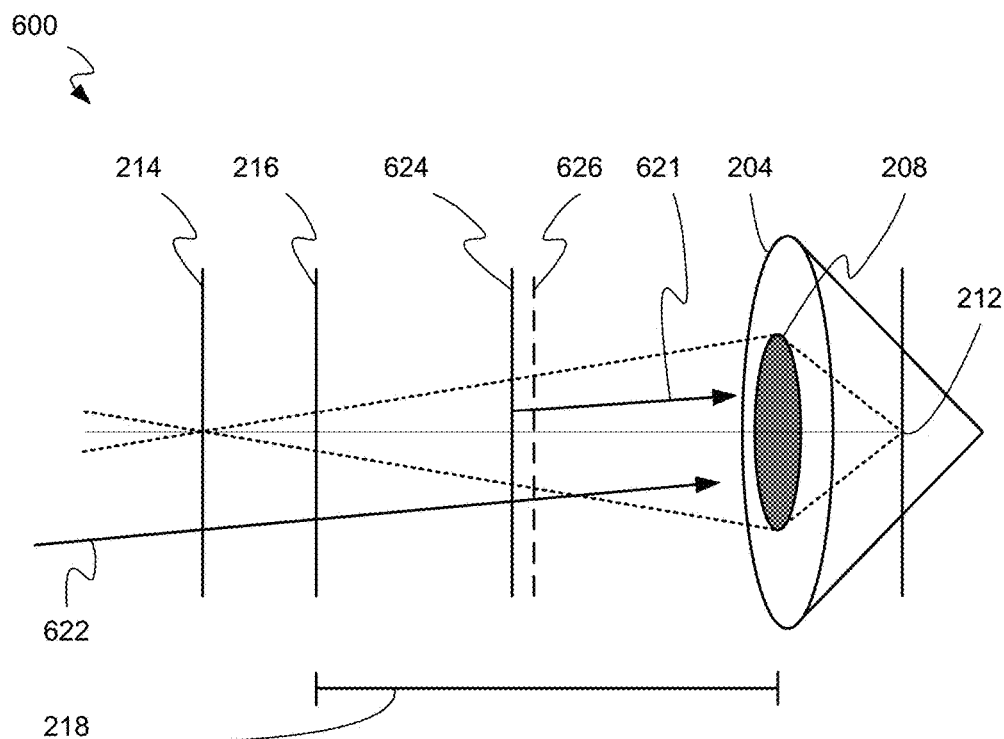
FIG. 6A illustrates a side view of a near-eye parallax barrier display, according to embodiments of the present invention.

FIG. 6A illustrates a side view of a near-eye parallax barrier display 600, according to embodiments of the present invention. FIG. 6A includes the eye 204 with the lens 208, retina plane 212, plane of focus 214, and near plane 216 of FIG. 2. FIG. 6A also includes a display 624 and a spatial light modulator (SLM) array 626 (or a parallax barrier or pinhole array). An SLM may absorb or attenuate rays or light, without significantly altering their direction. Thus, an SLM may alter the intensity and possibly the color of a ray, but not its direction. SLMs may include printed films, LCDs, light valves, or other mechanisms.

While the display 624 and SLM array 626 are within the minimum accommodation distance 218, they are operable to produce a light field to simulate an object, in focus, from within the accommodation range of the eye 204. For example, a ray of light 621 may be produced by the display 624 and SLM array 626 that is part of a light field simulating an object that is located beyond the near plane 216.

Regions of the display 624 and SLM array 626 may be operable to switch between being transparent, semi-transparent, and/or opaque. As a result, rays of light that originate from beyond the display 624 and SLM array 626 (e.g., from the surrounding environment) may still reach the eye 204. For example, a ray of light 622 originating from the surface of an object that may be 10 feet away may travel through the display 624 and SLM array 626 and to the eye 204. As a result, an observer may still be able to view at least portions of the surrounding environment.

Figure 6B:
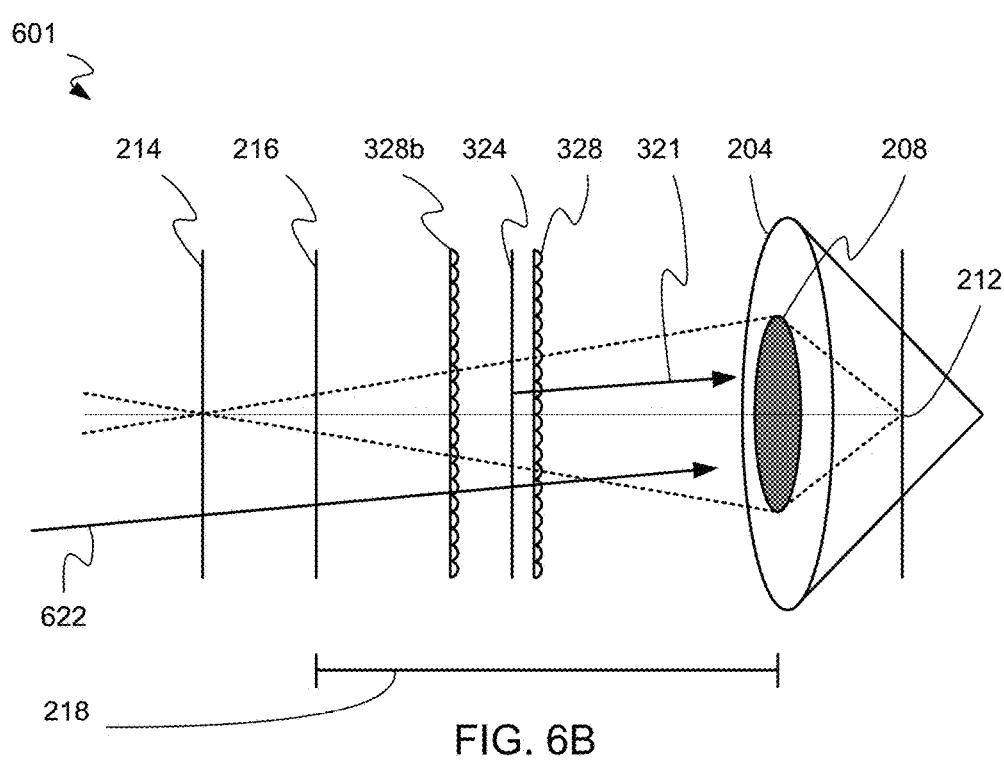
FIG. 6B illustrates a side view of a near-eye parallax barrier display and a microlens array, according to embodiments of the present invention.

FIG. 6B illustrates a side view of a near-eye parallax barrier display and a microlens array, according to embodiments of the present invention. FIG. 6B includes similar elements as FIG. 3B. FIG. 6A also includes a microlens array 328b that may be disposed between the near plane 216 and the display 324. The microlens array 328b, may for example, compress concave lenses rather than convex lenses. The combination of the microlens arrays 328 and 328b may allow a ray 622 to pass through a microlens system. The microlens arrays 328 and 328b may comprise a plurality of microlenses, in addition to other elements including masks, prisms, or birefringent materials.

Figure 7:
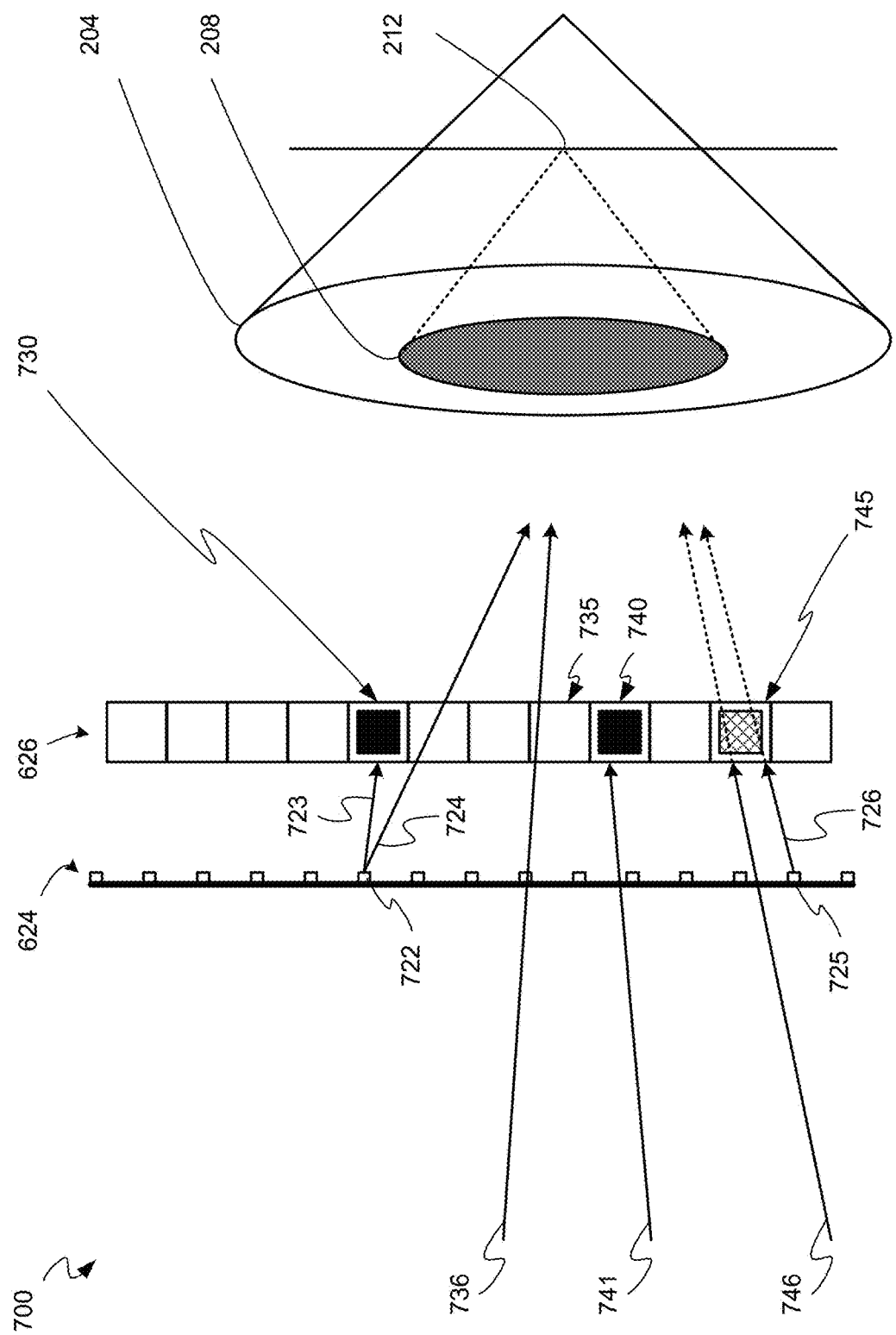
FIG. 7 illustrates a magnified side view of the near-eye parallax barrier display, according to embodiments of the present invention.

FIG. 7 illustrates a magnified side view of the near-eye parallax barrier display 600, according to embodiments of the present invention. FIG. 7 includes the display 624 and SLM array 626 of FIG. 6A. The display 624 may include multiple pixels, for example, pixels 722 and 725. The SLM array 626 may include multiple pinholes operable to allow, block, or otherwise modulate the passage of light at various points of the SLM array 626, for example, pixels 730, 735, 740, and 745. The parallax barrier 626 may be implemented with any spatial light modulator. For example, the parallax barrier 626 may be an LCD or OLED.

In one or more embodiments, the display 624 may include an array of light-emitting elements (e.g., a semitransparent OLED) and the SLM array 626 may include light-attenuating elements (e.g., a semitransparent LCD). In such an embodiment, rays of light 736, 741, and 746 originating from the surrounding environment may not be modified by the display 624 and the SLM array 626. Instead, modification to such rays of light may be achieved using an additional light shutter that blocks the rays from entering when the display 624 and the SLM array 626 are operating.

In one or more embodiments, both the display 624 and the SLM array 626 are light-attenuating SLMs. One of the display 624 or the SLM array 626 may display an array of slits/pinholes, while the other element displays a pre-filtering image to synthesize a light field by attenuating rays of light 736, 741, and 746 originating from the surrounding environment that pass through the layers. This would support "low power" cases where, by looking at a scene, rays are blocked to create text or images, rather than being emitted from the display 624, then blocked by the SLM array 626.

The SLM array 626 may allow certain rays of light through while blocking other rays of light. For example, the pixel 730 may block a ray of light 723 emitted by the pixel 722, while allowing the passage of another ray of light 724 emitted by the pixel 722. Accordingly, a light field may be produced because the SLM array 626 causes the light to travel anisotropically in one direction. Alternatively, multiple rays of light emitted by the pixel 722 may pass through the SLM array 626. In a conventional parallax barrier (slits and pinholes), only a single direction may pass, but in a generalized solution multiple directions may pass (even all directions in some cases, resulting in no blocks or modulation of rays of light emitted by the pixel 722). Further, the SLM array 626 may partially attenuate light at varying degrees. For example, the pixel 745 may partially attenuate a ray of light 726 emitted by the pixel 725.

The display 624 may be a semi-transparent display (e.g., a transparent LCD or OLED). Accordingly, rays of light originating from behind both the display 624 and the SLM array 626 from the perspective of the eye 204 may be allowed to pass through the display 624. As a result, the eye 204 may be able to view the surrounding environment even while the display 624 and SLM array 626 are placed in front of the eye 204.

However, the SLM array 626 may allow or block such rays of light originating from the surrounding environment. For example, a ray of light 736 originating from the surrounding environment may be allowed to pass through to the eye 204 by the pixel 735, while a ray of light 741 originating from the surrounding environment may be blocked from passing through to the eye 204 by the pixel 740. The rays of light 736, 741, and 746 may also be modulated by the display 624. Thus, the display 624 may behave as another SLM similar to the SLM array 626, a semi-transparent light emitter, or a combination of an SLM array and an emitter.

In addition, the SLM array 626 may partially attenuate such light at varying degrees. For example, the pixel 745 may partially attenuate a ray of light 746 originating from behind both the display 624 and the SLM array 626 from the perspective of the eye 204.

Accordingly, since rays of light from the surrounding environment may reach the eye 204, a viewer may be able to generally view the environment while the display 624 and SLM array 626 may modify what the viewer can see by adding and/or removing rays of light. For example, a light-attenuating element (e.g., an LCD) may include black text in an observer's view by blocking light, or a light-emitting element (e.g., an OLED) may include white text in an observer's view by emitting light. As a result, the display 624 and SLM array 626 may provide an augmented reality experience.

Figure 10:
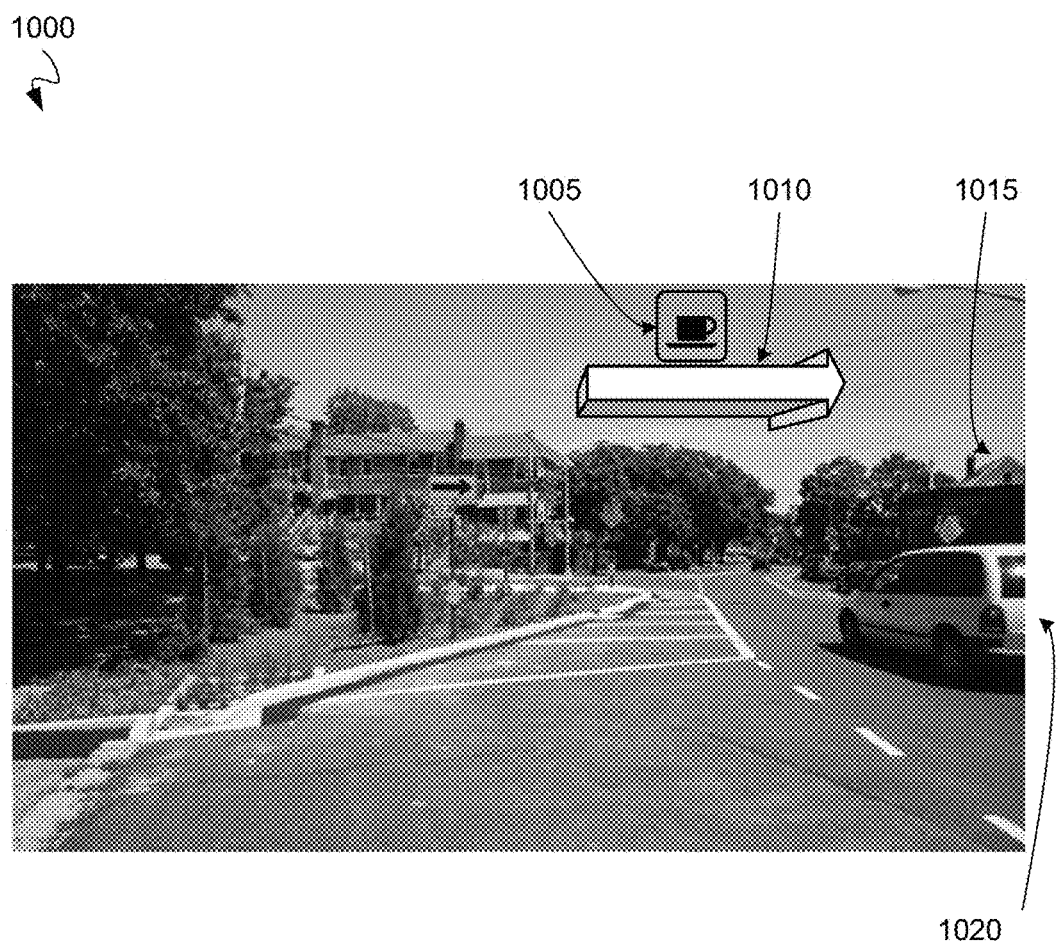
FIG. 10 depicts a view through the near-eye parallax barrier display, according to embodiments of the present invention.

For example, FIG. 10 depicts a view through the near-eye parallax barrier display 600, according to embodiments of the present invention. The view includes the surrounding environment, which in this example includes streets, buildings, trees, and so on. The near-eye parallax barrier display 600 may modify the view by including, for example, a coffee sign 1005 with an arrow 1010 pointing in the direction of a café.

In one or more embodiments of the invention, accommodation cues may be provided. For example, if the arrow 1010 was instead labeling and pointing to the house 1015, and the viewer's eyes are focused on a car 1020 that is located at a closer distance than the house 1015, the arrow 1010 may be blurred slightly to approximate the same blurring amount of the house 1015. Accordingly, the natural human accommodation/defocus effect may be simulated.

It should be appreciated that the near-eye parallax barrier display 600 may provide a virtual reality experience when operating as an immersive display, for example, by blocking all light from the surrounding environment and providing imagery through the display 624 and SLM array 626.

In FIGS. 6 and 7, the SLM array 626 is between the eye 204 and the display 624. However, it should be borne in mind that embodiments of the invention allow for the display 624 to be between the eye 204 and the SLM array 626.

It should also be appreciated that the display 624 and/or SLM array 626 may produce an image that is recognizable or in focus only when viewed while located closer than the near plane 216. For example, the image may seem blurry or out of focus when viewed in the accommodation range. The display 624 may display a pre-filtered image, corresponding to a target image to be ultimately projected, that is unrecognizable when viewed without the SLM array 626. When the pre-filtered image is viewed with the SLM array 626, the target image may be produced and recognizable. A computer system or graphics processing system may generate the pre-filtered image corresponding to the target image.

In addition, it should be borne in mind that FIGS. 6 and 7 illustrate the near-eye parallax barrier display 600 from a side view and that the near-eye parallax barrier display 600 may be a three dimensional object that extends into or out of the page. For example, the near-eye parallax barrier display 600 may extend horizontally and vertically across reading glasses. It should further be noted that separate near-eye parallax barrier displays may be placed in front of each eye of a viewer. In addition, it should be appreciated that the near-eye parallax barrier display 600 may occupy only a portion of the view of an observer.

Figure 8:
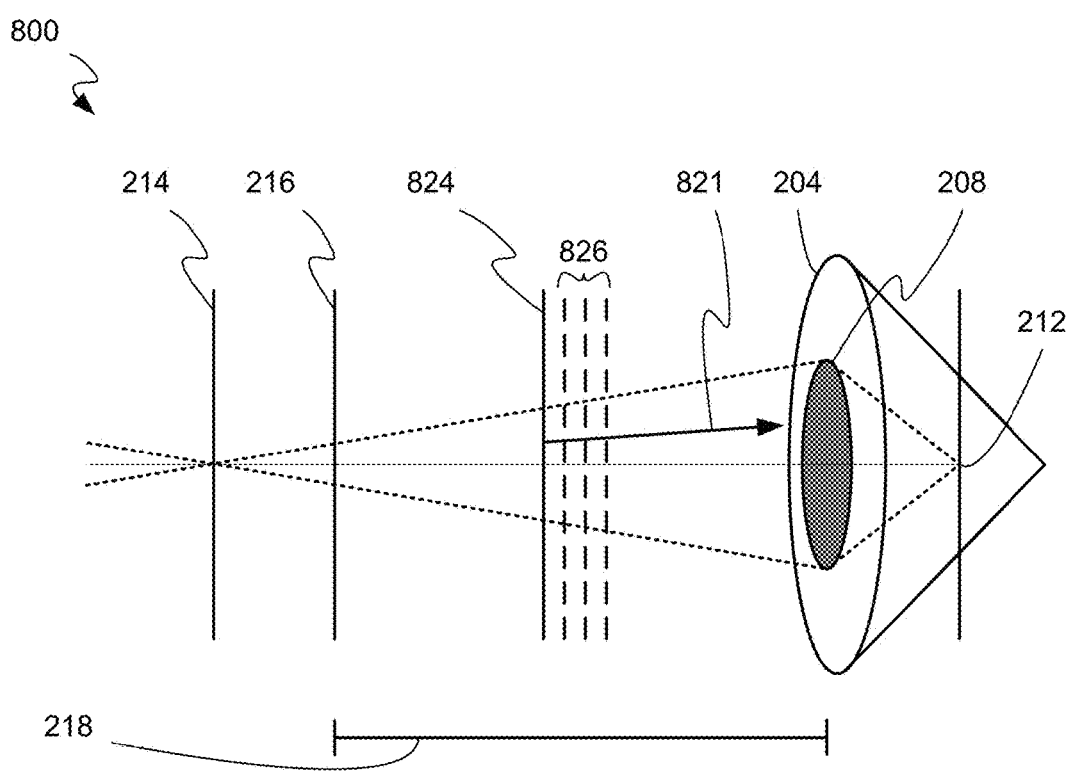
FIG. 8 illustrates a side view of a near-eye multilayer SLM display, according to embodiments of the present invention.

FIG. 8 illustrates a side view of a near-eye multilayer SLM display 800, according to embodiments of the present invention. The near-eye multilayer SLM display 800 of FIG. 8 may be similar to the near-eye parallax barrier display 600 of FIG. 6A. However, the near-eye multilayer SLM display 800 of FIG. 8 includes multiple SLM arrays 826. By using multiple SLM arrays, the brightness, resolution, and/or the depth of field may be improved. Further, by using high-speed SLMs that refresh faster than the human flicker fusion threshold, the resolution can approach that of the native display resolution. Embodiments of the invention provide for the application of high-speed displays, as in FIGS. 6 and 7, to two-layer SLMS, other two-layer configurations, and multilayer SLMs.

Figure 9:
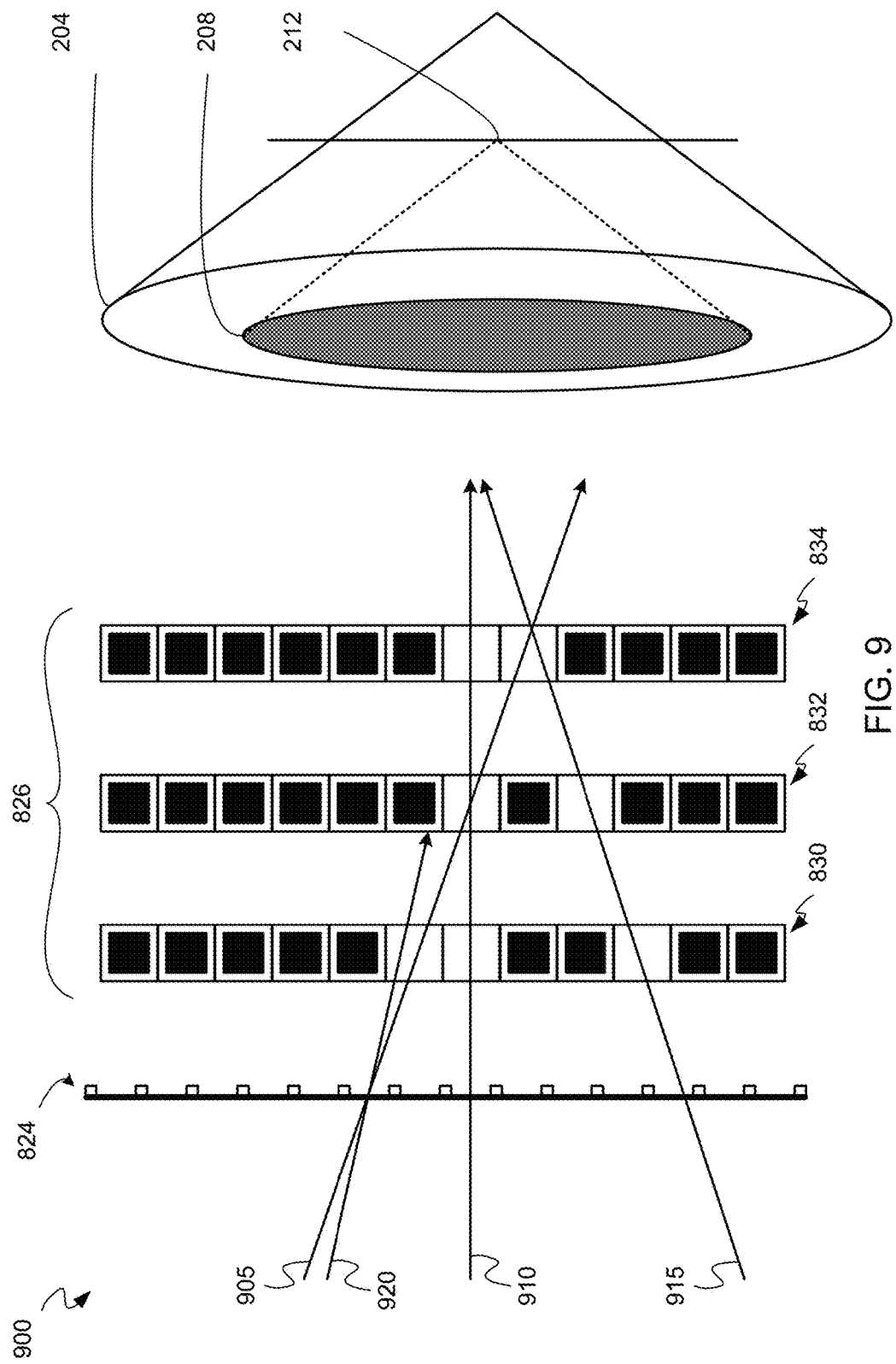
FIG. 9 illustrates a magnified side view of the near-eye multilayer SLM display, according to embodiments of the present invention.

FIG. 9 illustrates a magnified side view of the near-eye multilayer SLM display 800, according to embodiments of the present invention. FIG. 9 is similar to FIG. 7 in that it includes the eye 204 and a display 824. However, FIG. 9 also includes multiple SLM arrays 826, for example, the SLM arrays 830, 832, and 834. In the embodiment shown, the multiple SLM arrays 826 include three SLM arrays. However, embodiments of the invention allow for any number of SLM arrays.

The multiple SLM arrays 826 allow for increased control over the light that is allowed to pass through to the eye 204. For example, the multiple SLM arrays 826 may allow a more defined light field to be provided to the eye 204 because each additional SLM array may help to further define the rays of light. As a result, the resolution and/or depth of field of imagery may be improved. For example, a ray of light 905 may be allowed to pass through to the eye 204 while a ray of light 920 may be blocked by the SLM array 832, but would have otherwise been able to pass if only the SLM array 830 was located between the ray of light 920 and the eye 204. It should be appreciated that pixels in the multiple SLM arrays 826 may partially attenuate a ray of light, similar to the pixel 745 of FIG. 7.

Further, because the paths of multiple rays of light may overlap, such rays may travel through the same SLM element of a SLM array, and as a result, more light may be allowed to reach the eye 204. For example, the rays of light 905 and 910 may travel through the same SLM element of the SLM array 832, and the rays of light 905 and 915 may travel through the same SLM element of the SLM array 834.

In addition, the resolution or brightness may be increased by modulating the SLM arrays at high speeds. For example, if the human eye may be only able to detect images at 60 Hz, the SLM arrays may modulate ten times faster at 600 Hz. While a ray of light was blocked from traveling to the eye 204 during a first frame, the SLM arrays may modulate to allow the same ray of light to pass through, thereby increasing resolution or brightness.

In FIGS. 8 and 9, the multiple SLM arrays 826 are between the eye 204 and the display 824. However, it should be borne in mind that embodiments of the invention allow for the display 824 to be between the eye 204 and the multiple SLM arrays 826.

It should further be noted that separate SLM arrays and/or displays may be placed in front of each eye of a viewer. Accordingly, binocular viewing may be achieved. As a result, the depth perception cues of binocular disparity and convergence may be fully or approximately simulated. Each light field may also support the depth cue to accommodation (focusing) to be correctly simulated.

Furthermore, by using a pair of SLM arrays displays, binocular disparity, convergence, and accommodation are simultaneously and fully or approximately simulated, producing a "comfortable" sensation of the 3D scene extending behind the display 624 or 824.

In addition, since the synthesized light field may extend beyond the lens/pupil 208, the viewer may move left/right/up/down, rotate their head, or change the distance between their eye 204 (e.g., due to different users), maintaining the illusion of the virtual 3D scene. Embodiments of the present invention also support a fourth depth cue called motion parallax.

Further, it should be appreciated that SLM arrays and/or displays may occupy only a portion of the view of an observer.

Near-Eye Optical Deconvolution Displays

Figure 11:
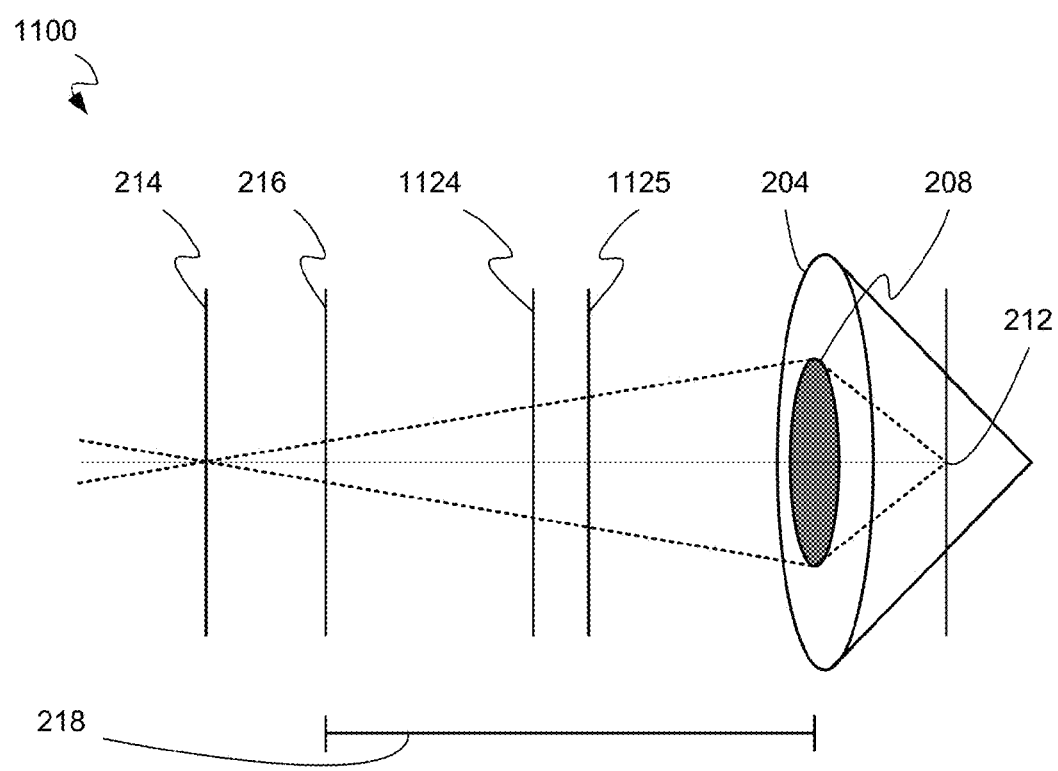
FIG. 11 illustrates a side view of a near-eye optical deconvolution display, according to embodiments of the present invention.

FIG. 11 illustrates a side view of a near-eye optical deconvolution display 1100, according to embodiments of the present invention. FIG. 11 includes the eye 204 with the lens 208, retina plane 212, plane of focus 214, and near plane 216 of FIG. 2. FIG. 11 also includes a first display 1124 and optionally additional displays like display 1125. These displays may be located nearer to the eye 204 than the near plane 216. Therefore, as discussed with relation to FIG. 2A, an image displayed by the display 1124 will be typically out of focus to the eye 204.

However, embodiments of the present invention allow for the display 1124 to produce an image that is clear and in focus when perceived by the eye 204. Surfaces viewed at such close distances are blurred in a certain way. Embodiments of the invention allow for the display of an image that has been inversely blurred so that a natural blurring effect of an eye will cancel out the inverse blur, resulting in an in focus image.

Figure 12A:
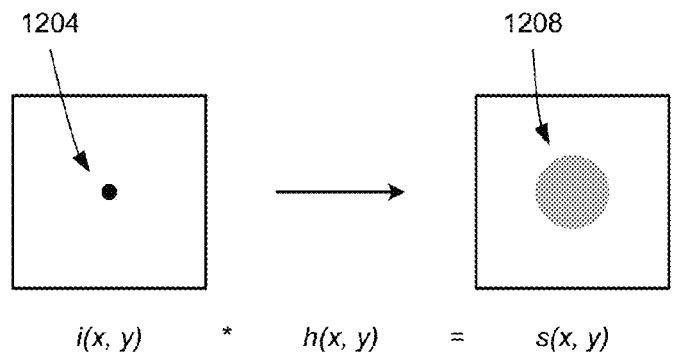
FIG. 12A depicts images before and after convolution, according to embodiments of the present invention.

FIG. 12A depicts images before and after convolution, according to embodiments of the present invention. FIG. 12A includes a dot 1204 on a surface. When the dot 1204 is viewed by an eye within the minimum accommodation distance of the eye, the dot 1204 may appear blurred to an observer. For example, the perceived blurred image may be depicted by a disk 1208. A function s(x, y) describing the disk 1208 may be the result of a convolution operation of a function i(x, y) describing the dot 1204 with a second function h(x, y). The second function may be, for example, the point spread function (PSF). The point spread function may describe the effect of a defocused eye attempting to view a plane outside the accommodation distance of the eye.

Accordingly, the natural blurring effect caused by the eye may be described by a convolution operation. For example, the following mathematical equation may describe the relationship between the dot 1204 and the disk 1208:

$$i(x,y)*h(x,y)=s(x,y)$$

Figure 12B:
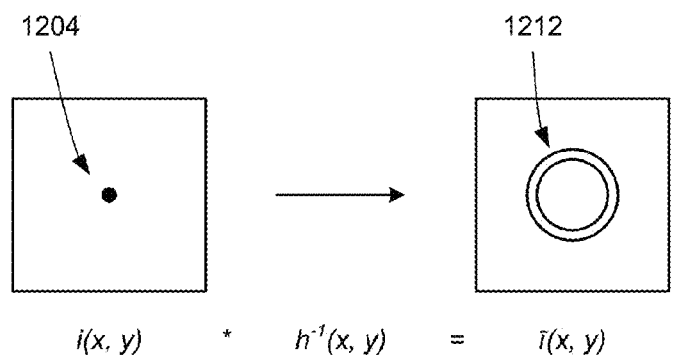
FIG. 12B depicts images before and after deconvolution, according to embodiments of the present invention.

FIG. 12B depicts images before and after deconvolution, according to embodiments of the present invention. FIG. 12B includes the same dot 1204 as in FIG. 12A. In order to cancel, reverse, or counter the blurring effect caused by the eye, a deconvolved or pre-filtered image may be produced. For example, a deconvolved dot 1212 of the dot 1204 may be produced by performing a deconvolution operation on the dot 1204. The result of the deconvolution operation, e.g., the deconvolved dot 1212, may be depicted by two concentric rings. The two concentric rings may have differing intensities.

More specifically, if the dot 1204 described by the function i(x, y) is convoluted with the inverse of the second function $h^{-1}(x, y)$, the resulting function describing the deconvolved dot 1212 may be ĩ(x, y). The inverse of the second function may be, for example, the inverse of the PSF.

Accordingly, the opposite or inverse of the natural blurring effect caused by the eye may be described by a deconvolution operation. The following mathematical equation may describe the relationship between the dot 1204 and the deconvolved dot 1212:

$$i(x,y)*h^{-1}(x,y)=\tilde{i}(x,y)$$

The deconvolution operation may reduce in negative values, which may not be synthesized by the display or values outside the dynamic range of the display. The deconvolved image ĩ(x, y) may be filtered to transform the deconvolution output to be within the dynamic range of the display device.

Figure 12C:
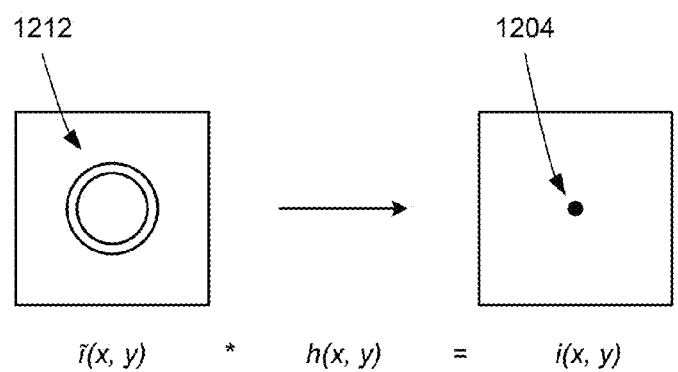
FIG. 12C depicts a deconvolved image before and after convolution, according to embodiments of the present invention.

FIG. 12C depicts a deconvolved image before and after convolution, according to embodiments of the present invention. When a convolution operation is performed on a function describing a deconvolved image, the resulting function may describe the original image. For example, when the deconvolved dot 1212 described by ĩ(x, y) undergoes a convolution operation with the second function h(x, y), the result may be the function i(x, y) describing the original dot 1204. The second function may be, for example, the PSF.

The following mathematical equation may describe the relationship between the deconvolved dot 1212 and the dot 1204:

$$\tilde{i}(x,y)*h(x,y)=y$$

Accordingly, an eye may perceive an image completely or at least approximately similar to the original dot 1204 in focus when viewing a deconvolved version 1212 of the dot in a near-eye range (nearer to the eye than the near plane of the eye) because the eye's convolution effect may translate the deconvolved version of the dot completely or at least approximately similar to the original dot 1204. This approximation may have reduced contrast or other artifacts, but may still improve the legibility or recognizability of the image, as compared to a conventional display without pre-filtering or deconvolution applied.

It should be appreciated that the function i(x, y) may describe multiple points or pixels on a surface that together form an image. Accordingly, the deconvolved function ĩ(x, y) may correspond to multiple points or pixels that together form a deconvolved version of the image. As a result, when the deconvolved version of the image described by the deconvolved function ĩ(x, y) is viewed in near-eye ranges, the original image described by the function i(x, y) may be perceived by an observer.

Returning to FIG. 11, a deconvolved image may be displayed by the display 1124. Since the display 1124 is within the near-eye range, the observer may perceive a convoluted version of the deconvolved image. As discussed above, a convolution of an image deconvolved by the inverse of the convolution function will result in substantially the original image. Accordingly, the observer will perceive an in focus image since the blurring effect of the eye will have been countered by the display of the deconvolved image. Therefore, an image may be recognizable by an observer in near-eye ranges.

It should be appreciated that embodiments of the present invention allow for pre-filtering processes other than deconvolution. For example, other operations besides deconvolution may be used to create a pre-filtered image that when viewed at near-eye distances, provides a recognizable image to an observer after undergoing the eye's convolution effect.

It should be appreciated that multiple displays may be used. It should further be appreciated that the displays 1124 and 1125 may be semi-transparent. As a result, the eye 204 may be able to view images displayed by the display 1124 through the display 1125. The eye 204 may also be able to view the surrounding environment through both the displays 1124 and 1125. Multiple layers of displays may also decrease or eliminate artifact ringing and improve contrast.

It should also be appreciated that optical deconvolution displays may block the light from the surrounding environment to provide VR applications. For example, a display may block a portion of an observer's view while providing a deconvolved image in another portion. Or, for example, a first display in a multilayer deconvolution display may block light while a second display provides a deconvolved image.

Alternatively, such displays may generally allow the light from the surrounding environment and block only portions of the incoming light and/or augment portions with light produced by the display to provide AR applications.

It should also be appreciated that the displays 1124 and 1125 may display an image that is recognizable or in focus only when viewed while located closer than the near plane 216. For example, the image may seem blurry or out of focus when viewed in the accommodation range. The displays 1124 and 1125 may display a pre-filtered image, corresponding to a target image to be ultimately projected, that is unrecognizable when viewed within the accommodation range. When the pre-filtered image is viewed within the accommodation range, the target image may be recognizable. A computer system or graphics processing system may generate the pre-filtered image corresponding to the target image.

Additional Embodiments

It should be appreciated that embodiments of the invention provide for combining layers of near-eye light field displays, near-eye parallax barrier displays, and/or near-eye optical deconvolution displays. Light field displays and optical deconvolution displays may present different performance trade-offs. Light field displays may require high-resolution underlying displays to achieve sharp imagery, but otherwise preserve image contrast. In contrast, optical deconvolution displays may preserve image resolution, but reduce contrast.

The light field displays and optical deconvolution displays may be combined in order to benefit from the performance of each display and to support a continuous trade-off between resolution and contrast. For example, embodiments of the invention support performing optical deconvolution in the light field domain, rather than applied independently to each display layer.

Near-eye light field displays, near-eye parallax barrier displays, and/or near-eye optical deconvolution displays may be combined because such displays may implement semi-transparent displays. For example, such displays may implement a combination of light-attenuating (e.g., LCD) or light-emitting (e.g., OLED) displays.

It should be appreciated that embodiments of the invention allow for the use of multiple displays tiled together to form one effective display. For example, the display 324, display 624, display 824, or display 1124 and 1125 may comprise multiple sub-displays. Sub-displays may be tiled, e.g. side by side, to synthesize a form display. Unlike multiple monitor workstations, any gaps between displays may not introduce artifacts because the pre-filtered images may be modified to display on each tile to accommodate for the gaps between them.

Embodiments of the invention provide for both virtual reality (VR) and augmented reality (AR) applications. For example, near-eye light field displays, near-eye parallax barrier displays, and/or near-eye optical deconvolution displays may block the light from the surrounding environment to provide VR applications. Alternatively, such displays may generally allow the light from the surrounding environment and block only portions of the incoming light and/or augment portions with light produced by the display to provide AR applications.

In various embodiments, light from the surrounding environment may function as a backlight, with the display layers attenuating the incident light field. In some embodiments, at least one display layer may contain light-emitting elements (e.g., an OLED panel). In embodiments of the invention, a combination of light-attenuating and light-emitting layers can be employed. It should be appreciated that more than one layer may emit light. For example, in FIG. 9, in addition to display 824, SLM arrays 830, 832, and 834 may also emit light.

In one or more embodiments, each display layer may include either a light-attenuating display or a light-emitting display, or a combination of both (each pixel may attenuate and/or emit rays of light). Further embodiments may include multilayer devices, for example, OLED and LCD, LCD and LCD, or and so on.

For near-eye light field displays for VR applications, a 2D display may be covered with either a parallax barrier or microlens array to support comfortable accommodation. Furthermore, multiple light-attenuating layers may be used to increase brightness, resolution, and depth of field.

Further embodiments of the invention may include holographic display elements. For example, as the resolution increases, the pitch may become small enough such that diffractive effects may be accounted for. Image formation models and optimization methods may be employed to account for diffraction, encompassing the use of computer-generated holograms for near-eye displays in a manner akin to light field displays. Embodiments of the present invention provide for applying optical deconvolution to holographic systems, thereby eliminating the contrast loss observed with incoherent displays.

Embodiments of the present invention provide for lightweight "sunglasses-like" form factors with a wide field of view using near-eye displays as discussed above. Such displays can be practically constructed at high volumes and at low cost. Such displays may have a viable commercial potential as information displays, for example, depicting basic status messages, the time of day, and augmenting the directly perceived physical world.

Embodiments of the present invention provide for adjusting produced images to account for aberrations or defects of an observer's eyes. The aberrations may include, for example, myopia, hyperopia, astigmatism, and/or presbyopia. For example, a near-eye light field display, near-eye parallax display, or near-eye optical deconvolution display may produce images to counteract the effects of the observer's aberrations based on the observer's optical prescription. As a result, an observer may be able to view images in focus without corrective eyewear like eyeglasses or contact lenses. It should be appreciated that embodiments of the invention may also automatically calibrate the vision correction adjustments with the use of a feedback system that may determine the defects of an eye.

Embodiments of the invention may also adjust the provided image based on information from an eye-track adjustment system that may determine the direction of gaze and/or the distance of the eye from the display(s). Accordingly, the display(s) may adjust the image displayed to optimize the recognizability of the image for different directions of gaze, distances of the eye from the display, and/or aberrations of the eye.

Embodiments of the invention may also adjust the provided image based on information from one or more sensors. For example, embodiments may include an environmental motion-tracking component that may include a camera. The environmental motion-tracking component may track movement or changes in the surrounding environment (e.g., movement of objects or changes in lighting). In a further example, the movement of a user's body may be tracked and related information may be provided. As a result, embodiments of the invention may adjust the provided image based on the environment of a user, motions of a user, or movement of a user.

In another example, embodiments of the invention may include an internal motion-tracking component that may include a gyroscopic sensor, accelerometer sensor, an electronic compass sensor, or the like. The internal motion-tracking component may track movement of the user and provide information associated with the tracked movement. As a result, embodiments of the invention may adjust the provided image based on the motion. In other examples, sensors may determine and provide the location of a user (e.g., GPS), a head position or orientation of a user, the velocity and acceleration of the viewer's head position and orientation, environmental humidity, environmental temperature, altitude, and so on.

Information related to the sensor determinations may be expressed in either a relative or absolute frame of reference. For example, GPS may have an absolute frame of reference to the Earth's longitude and latitude. Alternatively, inertial sensors may have a relative frame of reference while measuring velocity and acceleration relative to an initial state (e.g., the phone is currently moving a 2 mm per second vs. the phone is at a given latitude/longitude).

Near-eye light field displays, near-eye parallax barrier displays, and/or near-eye optical deconvolution displays may be included in eyeglasses. For example, such displays may replace conventional lenses in a pair of eyeglasses.

Figure 13:
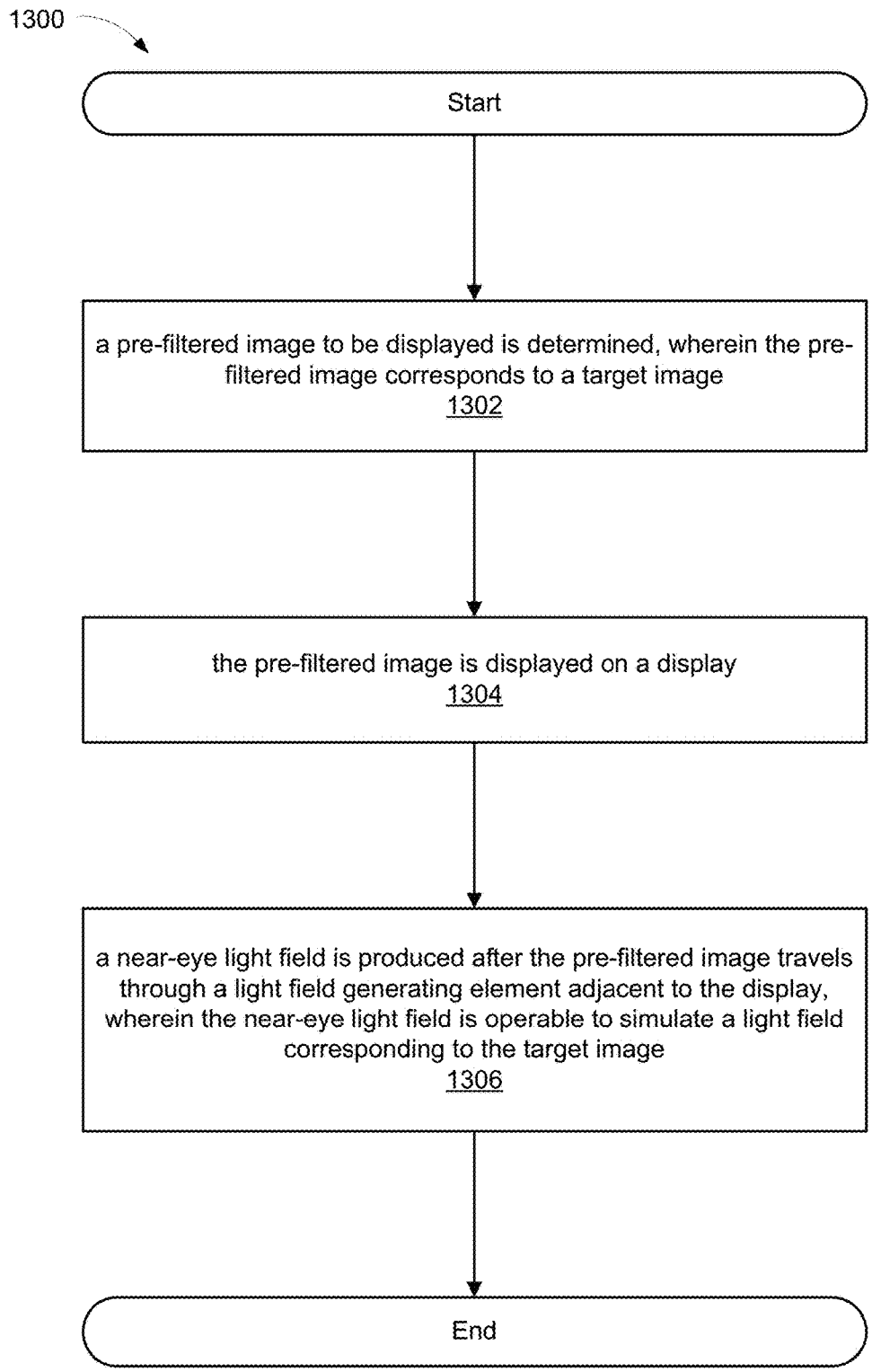
FIG. 13 depicts a flowchart of an exemplary process of displaying a near-eye image, according to an embodiment of the present invention.

FIG. 13 depicts a flowchart 1300 of an exemplary process of displaying a near-eye image, according to an embodiment of the present invention. In a block 1302, a pre-filtered image to be displayed is determined, wherein the pre-filtered image corresponds to a target image. For example, a computer system may determine a pre-filtered image that may be blurry when viewed by itself in an accommodation range but in focus when viewed through a filter or light field generating element.

In a block 1304, the pre-filtered image is displayed on a display. For example, in FIGS. 3B, 6, and 8, a pre-filtered image is displayed on the display 324, 624, and 826, respectively.

In a block 1306, a near-eye light field is produced after the pre-filtered image travels through a light field generating element adjacent to the display, wherein the near-eye light field is operable to simulate a light field corresponding to the target image. For example, in FIG. 3A, a light field corresponding to a target image is produced after the pre-filtered image passes through the microlens array 328. Similarly, in FIGS. 6 and 8, a light field corresponding to a target image is produced after the pre-filtered image passes through the SLM array 626 and multiple SLM arrays 826, respectively.

Figure 14:
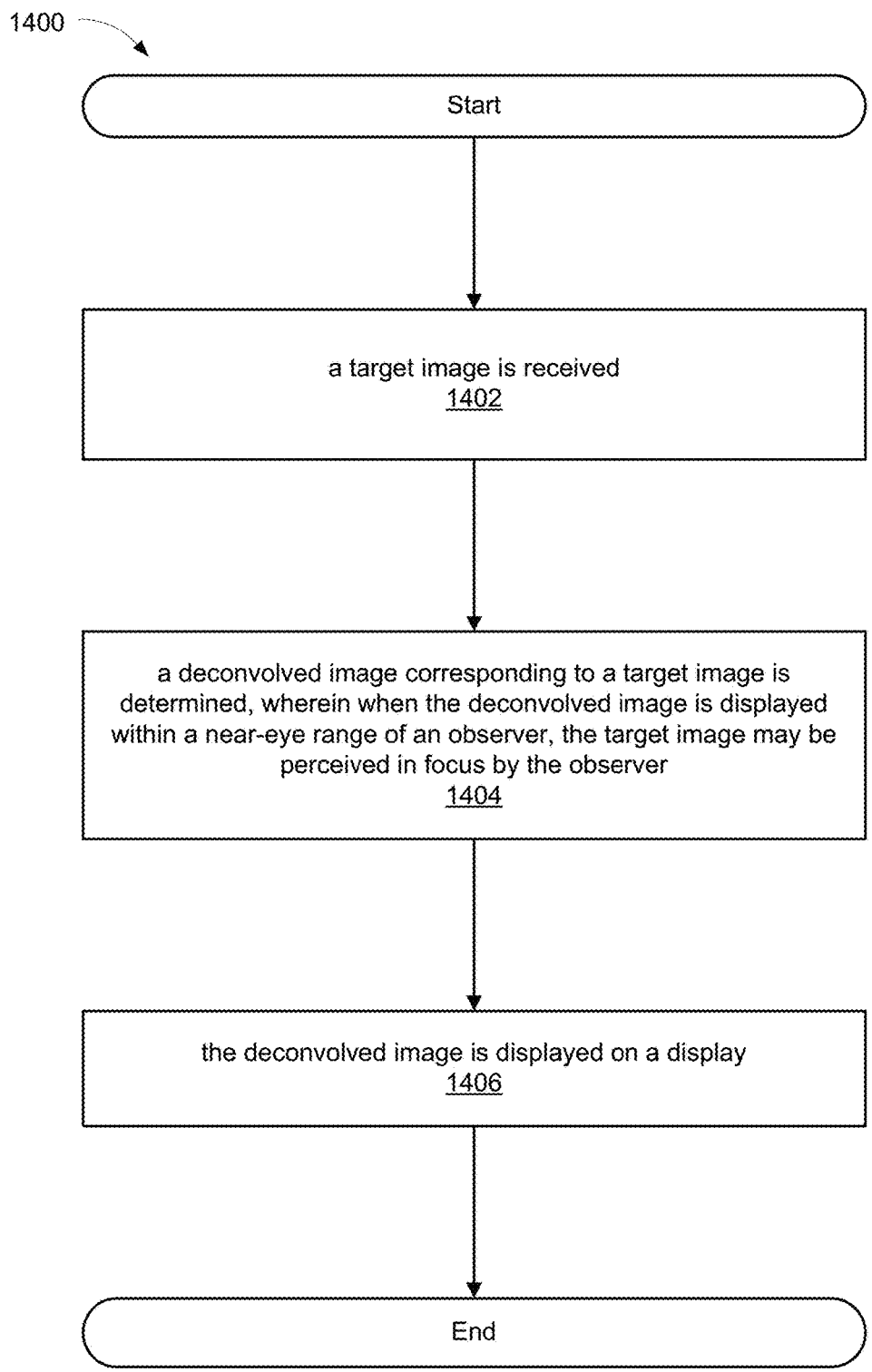
FIG. 14 depicts a flowchart of an exemplary process of displaying a near-eye image, according to an embodiment of the present invention.

FIG. 14 depicts a flowchart 1400 of an exemplary process of displaying a near-eye image, according to an embodiment of the present invention. In a block 1402, a target image is received. For example, a computer system may receive a target image from a graphics processing system In a block 1404, a deconvolved image corresponding to a target image is determined, wherein when the deconvolved image is displayed within a near-eye range of an observer, the target image may be perceived in focus by the observer. For example, in FIG. 12B, a deconvolved version of a target image is determined. As in FIG. 12C, when the deconvolved version of the target image undergoes a convolution operation of the eye, the target image is perceived in focus by an observer.

In a block 1406, the deconvolved image is displayed on a display. For example, in FIG. 11, a deconvolved image may be displayed on a display 1124 or 1125.

It should be appreciated that while embodiments of the present invention have been discussed and illustrated with various displays located within the near-plane but a distance from the eye, for example in FIGS. 3B, 6, 8, 11, embodiments of the present invention also provide for displays adjacent to the eye. For example, one or more layers of displays may be operable to adjoin an eye, similar to a contact lens. Because such displays may have a semi-spherical shape, the displays may account for affects of the shape to provide a sharp and recognizable image to the eye.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

What is claimed is:

1. An apparatus comprising:
a display device comprising a plurality of pixels;
a computer system coupled with said display and operable to instruct said display to display images;
a spatial light modulator (SLM) array located adjacent to said display and comprising a plurality of spatial light modulators (SLMs); and
a light shutter operable to block rays of light originating from a surrounding environment from entering said display device and said SLM array when said display device and said SLM array are operating,
wherein said SLM array is operable to produce a light field by altering light emitted by said display device to simulate an object that is in focus to an observer while said display device and said SLM array are located within a near-eye range of said observer, and wherein said SLM array comprises an array of high-speed SLMs operable to refresh at a faster rate than a flicker fusion threshold for a human eye.

2. The apparatus of claim 1, wherein each SLM of said plurality of SLMs is operable to modulate light produced by said display.

3. The apparatus of claim 2, wherein said display device is semi-transparent, and further wherein each SLM of said plurality of SLMs is operable to modulate light passing through said display device.

4. The apparatus of claim 1, wherein said SLM array is operable to project anisotropic light by altering isotropic light produced by said display device.

5. The apparatus of claim 1, wherein said light field is operable to simulate a 3D object located beyond said near-eye range of said observer.

6. The apparatus of claim 1, wherein said computer system is operable to determine an image for display that counteracts aberrations of said observer's eye.

7. The apparatus of claim 1, further comprising a feedback system operable to make measurements of aberrations of said observer's eye; and
wherein said computer system is further operable to determine an image for display that counteracts said aberrations based on said measurements.

8. The apparatus of claim 1, further comprising a sensor operable to provide information related to a surrounding environment; and
wherein said computer system is further operable to determine an image for display that counteracts said aberrations based on said information.

9. The apparatus of claim 1, further comprising an eye-track adjustment system operable to track a gaze of an eye, wherein said eye-track adjustment system is operable to communicate information related to a gaze of an eye to said computer system for determination of an image for display by said computer system based on said information.

10. The apparatus of claim 1, wherein said display device comprises a plurality of sub-display devices disposed side by side with respect to each other.

11. An apparatus comprising:
a display device operable to produce an image;
a first SLM array located adjacent to said display device; and
a light shutter operable to block rays of light originating from a surrounding environment from entering said display device and said first SLM array when said display device and said first SLM array are operating,
wherein said first SLM array together with said display device is operable to produce a light field simulating a 3D object that is recognizable to an observer while said display device and said first SLM array are located within a near-eye range of said observer, and wherein said first SLM array comprises an array of high-speed SLMs operable to refresh at a faster rate than a flicker fusion threshold for a human eye.

12. The apparatus of claim 11, further comprising at least one additional SLM array located adjacent to said first SLM array.

13. The apparatus of claim 11, wherein said first SLM array is operable to display different versions, of an image produced by said display device, in different directions.

14. The apparatus of claim 11, wherein said image is out of focus if viewed without said first SLM array and said image is in focus if viewed through said first SLM array.

15. The apparatus of claim 11, wherein said display device is semi-transparent.

16. The apparatus of claim 11, wherein said first SLM array and said display device are operable to alter light from a surrounding environment and light from said display device to provide an augmented reality experience.

17. The apparatus of claim 11, wherein said first SLM array and said display device are operable to provide a virtual reality experience.

18. A method comprising:
determining a pre-filtered image to be displayed, wherein said pre-filtered image corresponds to a target image;
displaying said pre-filtered image on a display device; and
producing a near-eye light field after said pre-filtered image travels through an SLM array adjacent to said display device,
wherein said near-eye light field is operable to simulate a light field corresponding to said target image,
wherein a light shutter disposed in an apparatus comprising said SLM array and said display device is operable to block rays of light originating from a surrounding environment from entering said SLM array and said display device when said SLM array and said display device are operating, and wherein said SLM array comprises an array of high-speed SLMs operable to refresh at a faster rate than a flicker fusion threshold for a human eye.

19. The method of claim 18, wherein said target image simulated by said near-eye light field is in focus to an observer's eye when said display device and said SLM array are in a near-eye range of said observer's eye.

20. The method of claim 18, wherein said SLM array is operable to project anisotropic light by altering isotropic light produced by said display device.

21. The method of claim 18, wherein said determining is based on aberrations of said observer's eye, a gaze of said observer's eye, and a distance between said observer's eye and said SLM array.

22. The method of claim 18, wherein said SLM array is operable to display different versions of said target image in different directions.

23. The method of claim 18, wherein said SLM array comprises a plurality of SLM array layers.

24. The apparatus of claim 1, further wherein regions of said display device and said SLM array are operable to switch between transparent, semi-transparent, and opaque modes of operation.

25. The apparatus of claim 11, further wherein regions of said display device and said first SLM array are operable to switch between transparent, semi-transparent, and opaque modes of operation.

26. The method of claim 18, further wherein regions of said display device and said SLM array are operable to switch between transparent, semi-transparent, and opaque modes of operation.

* * * * *